United States Patent
Ries

(10) Patent No.: US 7,741,738 B2
(45) Date of Patent: Jun. 22, 2010

(54) MACHINE COMPRISING A ROTOR AND A SUPERCONDUCTING ROTOR WINDING

(75) Inventor: Günter Ries, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 638 days.

(21) Appl. No.: 10/543,625

(22) PCT Filed: Jan. 26, 2004

(86) PCT No.: PCT/EP2004/000633

§ 371 (c)(1),
(2), (4) Date: Jul. 6, 2006

(87) PCT Pub. No.: WO2004/068682

PCT Pub. Date: Aug. 12, 2004

(65) Prior Publication Data

US 2006/0293189 A1 Dec. 28, 2006

(30) Foreign Application Priority Data

Jan. 28, 2003 (DE) .................. 103 03 307

(51) Int. Cl.
*H02K 9/00* (2006.01)
*H02K 5/00* (2006.01)
*H02K 55/00* (2006.01)
*H02K 9/19* (2006.01)
*H02K 5/04* (2006.01)
*H02K 5/20* (2006.01)

(52) U.S. Cl. ............................. 310/52; 310/91; 310/214

(58) Field of Classification Search .................. 310/52, 310/165, 336, 91, 248, 214; *H02K 9/00, H02K 5/00, 9/19, 5/04, 5/20*
See application file for complete search history.

(56) References Cited

U.S. PATENT DOCUMENTS

| 2,334,976 A | * | 11/1943 | Winther | 310/52 |
| 3,991,333 A | * | 11/1976 | Laskaris | 310/52 |
| 4,146,804 A | | 3/1979 | Carr, Jr. | |
| 6,489,701 B1 | * | 12/2002 | Gamble et al. | 310/179 |
| 6,597,082 B1 | * | 7/2003 | Howard et al. | 310/52 |
| 2002/0145355 A1 | * | 10/2002 | Maguire et al. | 310/179 |
| 2002/0171304 A1 | * | 11/2002 | Laskaris et al. | 310/91 |
| 2002/0171319 A1 | * | 11/2002 | Wang et al. | 310/261 |
| 2002/0171322 A1 | * | 11/2002 | Dawson et al. | 310/261 |
| 2003/0011452 A1 | * | 1/2003 | Snitchler et al. | 335/216 |

FOREIGN PATENT DOCUMENTS

| DE | 19943783 A1 | | 3/2001 |
| EP | 0690550 B1 | | 11/1997 |
| EP | 0805546 B1 | | 1/2002 |
| EP | 1261114 A1 | * | 11/2002 |
| JP | 2003-23767 | | 1/2003 |
| WO | WO98/02953 A1 | | 1/1998 |

\* cited by examiner

*Primary Examiner*—Quyen Leung
*Assistant Examiner*—Michael Andrews
(74) *Attorney, Agent, or Firm*—Staas & Halsey, LLP

(57) ABSTRACT

A machine has an uncooled rotor body, which is mounted to rotate about a rotational axis, and has a superconducting rotor winding that is located in at least one cryostat and is cooled by a coolant. To facilitate the assembly of the winding and the cryostat, the exterior of the rotor body is provided with flattened sections, which accommodate at least one cryostat. At least one coil of the rotor winding is located in a retaining device that essentially only absorbs tensile stress. Said tensile stress absorption of the retaining device is thus carried out in the flattened sections of the rotor body. HTS material is preferably used for the rotor conductors.

22 Claims, 4 Drawing Sheets

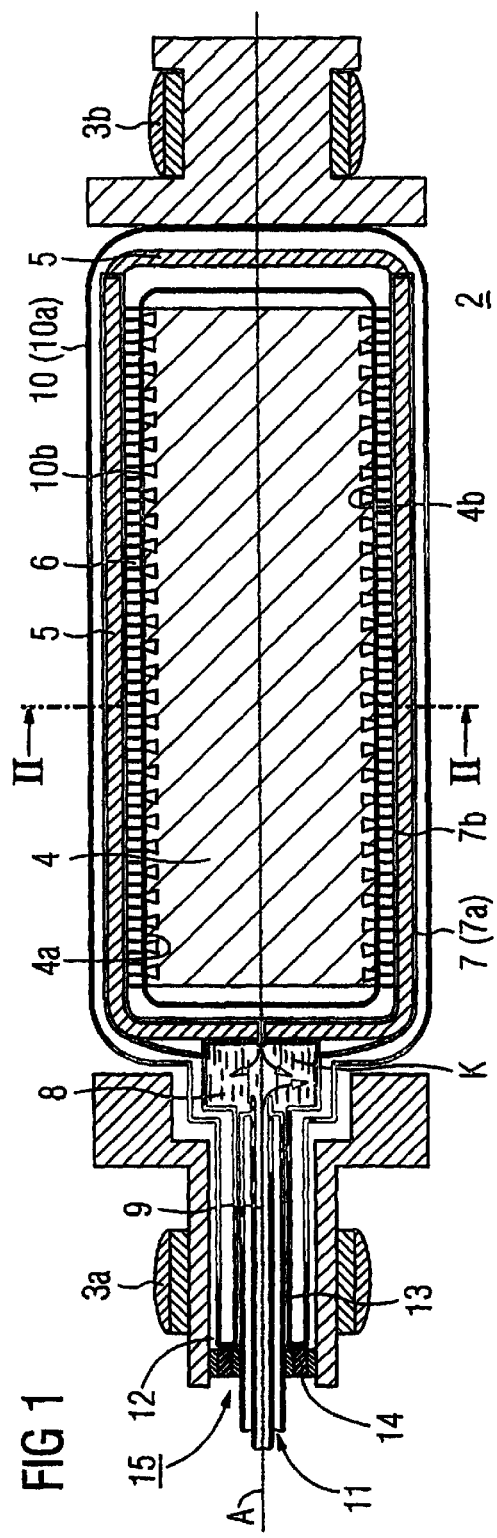
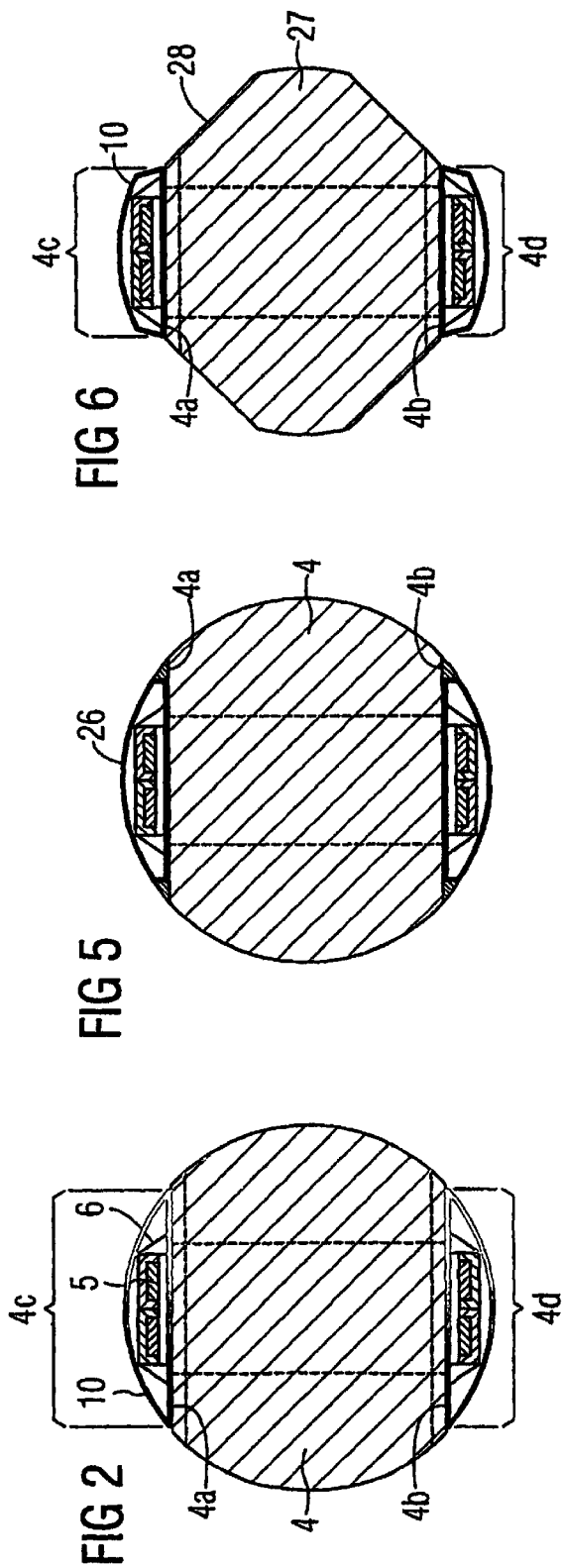

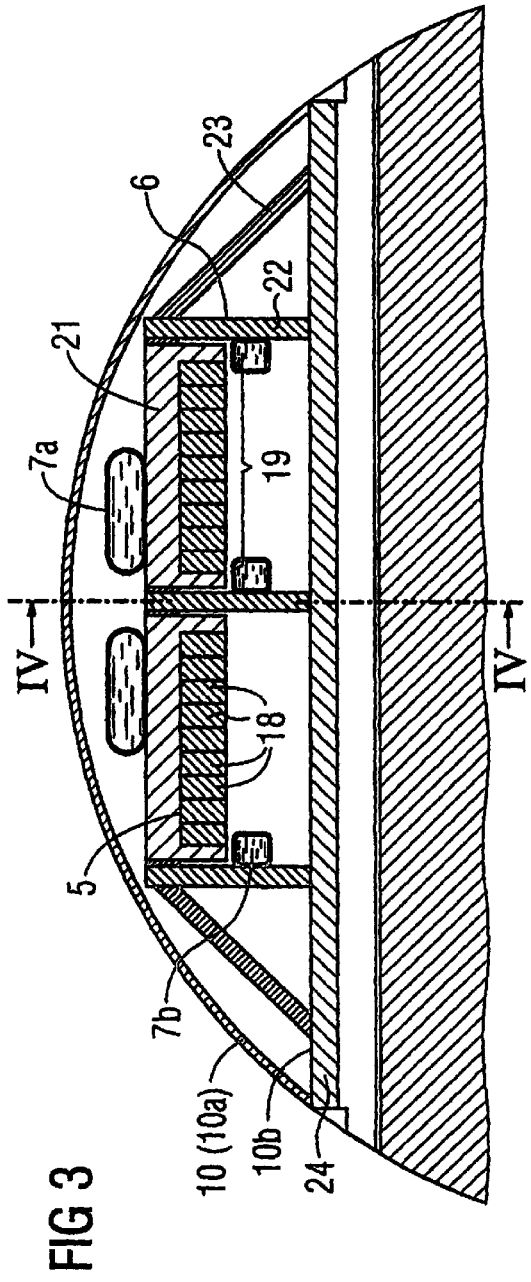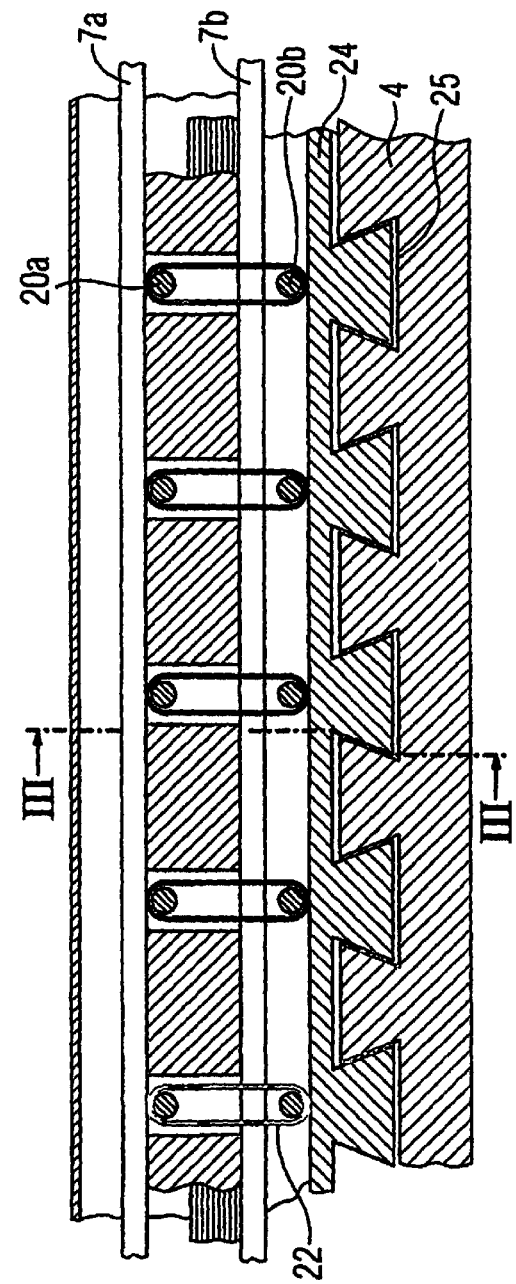

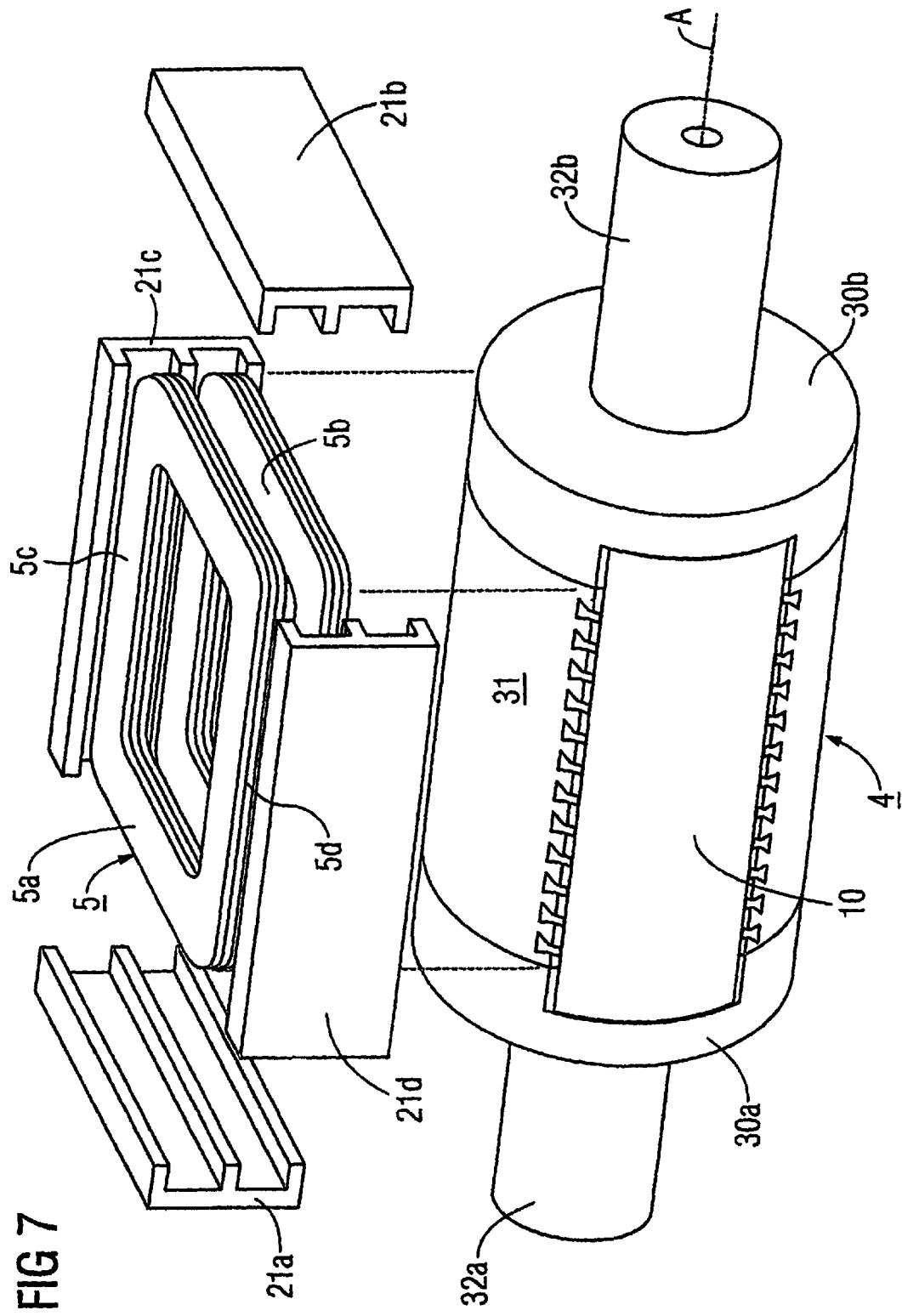

MACHINE COMPRISING A ROTOR AND A SUPERCONDUCTING ROTOR WINDING

CROSS REFERENCE TO RELATED APPLICATIONS

This application is based on and hereby claims priority to International Application No. PCT/EP2004/000633 filed on Jan. 26, 2004 and German Application No. 10303307.6 filed on Jan. 28, 2003, the contents of which are hereby incorporated by reference.

BACKGROUND OF THE INVENTION

The present invention relates to a machine having a rotor which is mounted so as to rotate about a rotation axis and contains a superconducting rotor winding, which is to be cooled or is cooled, and an uncooled rotor body. The rotor body has flattened parts on its outside so as to form outer regions respectively having a cross section at least similar to a circle segment, in which at least one coil of the rotor winding is arranged on a tensile retention holding device in at least one cryostat. A corresponding machine is disclosed by EP 1 261 114 A1.

Higher power densities, lower losses and further advantages can be achieved with a rotating superconducting excitation winding in superconducting technology machines such as synchronous motors and generators. The superconductor of the winding must in this case be cooled, and the winding needs to be enclosed in a high vacuum-isolated cryostat for thermal insulation reasons. The induced torque engages on the superconductor and must be forwarded to a warm rotor shaft via suitable transmission elements. Especially in large units, the centrifugal acceleration acting on the superconductor winding is a few thousand g (g=acceleration due to gravity) which has to be absorbed without damage to the superconductor material. Radial centrifugal forces and azimuthal magnetic forces need to be transmitted from the winding via suitable fastener to a mechanically stable rotor body, or a winding core or rotor core. This core may preferably be formed of a magnetically permeable material such as iron, so as to achieve an increase in the excitation field.

Embodiments of machines with a winding fastened directly on the cylindrical rotor body, which is formed of a nonmagnetic or magnetic material and which is at the winding temperature are known (DE 199 43 783 A1, U.S. Pat. No. 4,146,804 A1, WO 98/02953 A1). In corresponding large units, however, for example in power plant generators, the rotor body then comprises a large cooled mass of up to several tens of tonnes. This requires long cooling and warming times, stable elements for torque transmission to the warm shaft with a high heat flux in the cold region and a large vacuum cryostat which encloses the cold core and the winding.

Machines with rotors whose rotor body is not cooled to the temperature of the winding are also known (cf. EP 0 805 546 B1 or EP 0 690 550 B1). The windings are in this case of a so-called racetrack type and, together with a cryostat vacuum vessel, a cryoshield and cooling tubes carrying the coolant, are put into a groove machined in the warm rotor core. The groove is in this case closed externally by a comparatively massive closure element, via which forces acting on the winding during operation are absorbed and transmitted to the rotor core. Suspension straps or honeycomb structures in this case transmit forces between the winding and the shield, and between the shield and the closure element of the rotor core. At the ends, the winding cryostat is fed through radial bores in the rotor core. $Nb_3Sn$ is provided as a superconductor material for the windings, which is cooled with 10 K cold He gas. Details of the way in which the winding and the cryostat are designed in the respective groove are not disclosed by this related art. However, winding and mounting directly in the grooves requires considerable outlay.

The rotor body of the machine disclosed in the aforementioned EP 1 261 114 A1 is also uncooled. This rotor body has flattened parts on opposite longitudinal sides, so that outer regions with a cross section respectively similar to a circle segment are formed with respect to a cylindrical shape. In these outer regions, there is at least one cryostat for accommodating the conductors of the rotor winding to be cooled. At the ends, the winding cryostat is fed through radial bores in the rotor core. For mounting, the rotor core is designed in three parts; the magnetic core with flattened parts comprises the winding; fitted by bolts axially on both sides there are end pieces, which bear recesses for the winding on one side and the shaft ends of the rotor on the end facing outward. These end pieces may be formed of a nonmagnetic material such as stainless steel. At least one cold tensile element of a holding device, by which the radially opposite parts of the cryostat or cryostats and therefore the rotor winding are held, extends through the rotor body while being thermally insulated from it. Such fastening and holding of the rotor winding is elaborate. With this design of the machine, and especially its holding device, it is furthermore not sufficiently possible to absorb tangential forces which act during operation and particularly in the event of short circuits or other faults.

SUMMARY OF THE INVENTION

It is therefore one possible object of the present invention to refine a machine having the features mentioned in the introduction so that mounting of the winding is simplified compared with this related art, but reliable fastening is nevertheless ensured even when there are large radial and azimuthal forces.

Accordingly, the inventor proposes that the machine having the features mentioned in the introduction should be refined so that the tensile retention of the holding device takes place on the rotor body in the region of the flattened parts.

The advantages associated with this configuration are, in particular, that cold tensile elements extending through the rotor body and to be thermally insulated from it can be obviated. The holding device thus transmits the forces acting on the winding during operation essentially only in the form of tensile forces to the uncooled rotor body in the bottom region of the flattened parts. This also offers the advantage that besides the possibility of at least partially prefabricating the winding, the at least one coil of which can be designed as a flat racetrack coil or quadrilateral coil, the cryostat may be at least partially prefabricated and fastened on the laterally flattened regions of the warm rotor body, or completed there. The rotor body thus does not have longitudinal grooves to accommodate the winding or parts of the holding device. Another particular advantage is that, for test purposes, the winding can be cooled and tested without an iron core.

The machine designed in particular as a synchronous motor, preferably generator, may therefore also have the following features:

In order to increase the field, its rotor body may contain a rotor core of ferromagnetic material or be formed by this core.

Its at least one cryostat may be at least partially prefabricated, in which case it is to be fastened on the flattened parts. The cryostat may then have an outer contour supplementing the cylindrical shape of the rotor body.

At least one cryostat, or at least parts thereof, may be formed of a metal with high electrical conductivity, so that it can advantageously act as an electromagnetic damper shield.

The holding device of the machine preferably has strap-shaped and/or rod-shaped tensile elements. The tensile elements may in this case preferably be designed such that they allow longitudinal contraction of the rotor winding when cooling relative to the cryostat.

In general, the tensile elements may advantageously be formed of a thermally insulating material with sufficient mechanical strength.

The rotor winding may furthermore be arranged electrically insulated in support rails which are fastened on the tensile elements.

The winding height of at least one coil, to be measured in the radial direction, is preferably selected such that the maximum permissible cumulative compressive stresses of the superconducting conductors of the respective coil due to centrifugal and/or torque forces are not exceeded. In general, a plurality of coils of the rotor winding may then respectively be arranged in a winding chamber, the minimum number of chambers and/or coils being dictated by the maximum permissible winding height of the respective coil in the chamber assigned to it.

Its rotor winding may furthermore have at least one rectangular coil or a coil of the racetrack type or two saddle coils.

Its rotor winding, having a rectangular coil or a coil of the racetrack type, may then be arranged on a middle part of an assemblable rotor body.

The rotor winding may be at least partially prefabricated.

Coolant lines for a gaseous and/or liquid circulating coolant may furthermore extend axially parallel on the rotor winding or through it. In this case, it is favorable for the coolant to circulate in the coolant lines with the use of free (natural) convection. The circulation of the coolant may, in particular, take place in thermosiphon loops.

At least some of the coolant lines may then advantageously be in thermal communication with parts, in particular tensile elements, of the holding device.

The rotor winding may, in particular, be made with conductors of HTS (high temperature superconducting) material. Conductors of LTS (low temperature superconducting) material may of course also be used instead of this. The conductors used may be strip conductors or stranded composite conductors.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIGS. 1 and 2 show a first embodiment of a machine according to one embodiment of the invention in longitudinal and cross section, FIGS. 3 and 4 show the cryostats of this machine in cross and longitudinal section, FIGS. 5 and 6 show further possible configurations of cryostats for various rotor bodies of machines according to one embodiment of the invention, FIG. 7 shows an embodiment of a rotor winding with a cryostat in a perspective view.

DETAILED DESCRIPTION OF THE PREFERRED EMBODIMENT

Figure 9:
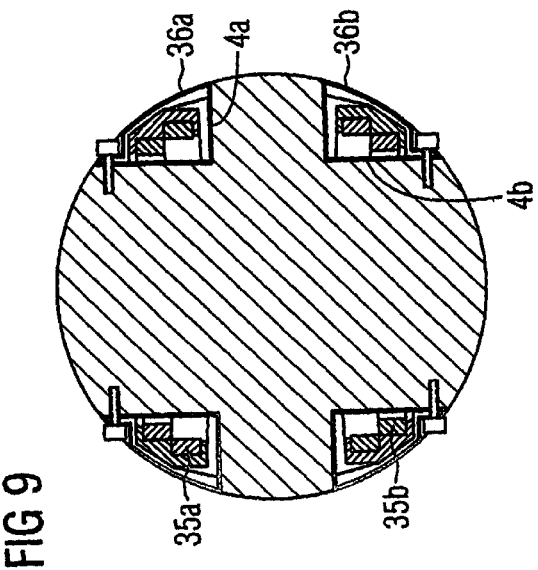
FIGS. 8 and 9 show another embodiment of a rotor body with two cryostats in perspective view and cross section.

Reference will now be made in detail to the preferred embodiments of the present invention, examples of which are illustrated in the accompanying drawings, wherein like reference numerals refer to like elements throughout.

Parts corresponding to one another in the figures are provided with the same references.

The rotor shown in FIGS. 1 and 2 is based on known embodiments, particularly of superconducting synchronous motors or generators. In the figure, 2 denotes generally the rotor mounted so as to rotate about an axis A 3a and 3b denote rotor bearings, 4 denotes a rotor body comprising a rotor core of uncooled iron, 4a and 4b denote radially opposite flattened parts of the rotor body, 5 denotes a prefabricated two-pole rotor winding using conductors of superconducting material, preferably high-$T_c$ superconductor material, 6 denotes a holding device for radial suspension or fastening of the winding, 7 denotes a coolant line system having at least one coolant input line 7a and at least one coolant return line 7b in thermal communication with the superconducting winding 5 for a coolant K, 8 denotes a co-rotating coolant (manifold) space, into which liquid coolant K is introduced from the outside via a stationary coolant feed line 9 and which is in communication with the coolant input line 7a and the coolant return line 7b, 10 denotes a co-rotating cryostat surrounding the superconducting winding 5, the coolant space 8 and the coolant feed channel 9, having a cryostat outer wall 10a and a cryostat inner wall 10b enclosing the rotor body 4, 11 denotes a static vacuum space enclosing the coolant feed channel 9, 12 denotes a rotating vacuum space, 13 denotes an annular gap seal formed between the stationary vacuum space 11 and a part of the rotating cryostat outer wall concentrically enclosing it, 14 denotes a ferrofluidic seal and 15 denotes a coolant transfer coupling known per se, especially with the coolant feed channel 9, the vacuum spaces 11 and 12 and the seals 13 and 14.

As shown in detail particularly by FIG. 2, one or more superconducting rectangular coils of the winding 5 are held in a vacuum-isolated housing of a ring cryostat 10 by the holding device 6, which at least essentially uses only tensile retention. At least on its outside, the cryostat preferably is formed of a metal with high electrical conductivity, such as aluminum or copper, so that it can act as an electromagnetic damper shield. In the manner which is known per se, the evacuated cryostat housing may also have parts to further reduce the thermal input onto the winding 5, such as heat radiation shields and/or superinsulation. The rectangular coils are prefabricated together with the rotating part of the coolant transfer coupling 15 which is known per se, via which the coolant K travels from the stationary parts to the rotating parts, particularly into the coolant manifold space 8. In the embodiment represented, the rotor winding has a two-pole design, its cryostat being arranged or fastened in the region of the flattened parts 4a and 4b on the outside of the rotor body 4. The outer regions existing there are generally denoted by 4c and 4d. Viewed in cross section, these outer regions respectively occupy an area at least approximately similar to a circle segment or cap with respect to a circular surface. Designs of the rotor winding having 4, 6, 8, etc. poles can correspondingly be produced with 2, 3, 4, etc. separate winding cryostats on a warm core with 4, 6, 8, etc. flattened parts.

Concerning the Embodiment of the Winding 5 in Particular According to FIG. 3

The advantageously prefabricated winding is fastened on the rotor body, specifically on a laterally flattened warm iron core.

The winding is formed of flat coils of the racetrack or quadrilateral type. It is preferably made of strip-shaped conductors of high-$T_c$ superconductor (HTS) material or of an HTS stranded composite conductor in the form of so-called pancakes 18, and is stacked in winding blocks inside winding chambers 19. The winding blocks are fitted on the radially inward side in one or more mutually adjacent winding chambers of rail-like, channel-like or trough-like holding elements, referred to below as support rails 21, which may in particular be formed of a nonmagnetic steel.

The number of turns is dictated by the required number of ampere-turns; the cross-sectional area is therefore determined by the product "winding height times total winding width".

The winding height in the individual winding chambers is limited by the maximum permissible pressure which will be exerted on the HTS conductors, on the surface facing the holding rails, due to centrifugal forces and/or torque forces on the HTS winding at maximum rotational speed. In the case of bismuth cuprate superconductor strips, the centrifugal pressure should be at most 50 Mpa, preferably less than 15 Mpa. The total winding width is also derived from the winding height.

The winding chamber widths are dimensioned such that, for the torques acting on the winding in all operating and/or fault situations which may occur, the cumulative surface pressures due to the azimuthal forces on the superconducting windings on the side faces of the winding chambers do not exceed the maximum permissible value. In the case of bismuth cuprate superconductor strips, the corresponding pressure should be at most 50 MPa, preferably less than 15 MPa.

For a predetermined total winding width and winding height, the minimum number of winding chambers required is derived therefrom. The embodiments according to FIGS. 1 to 4 and 7 respectively assume windings with two chambers.

The tensile elements of the holding device 6 engage on the support rails 21, preferably in the region of the bars formed between the winding chambers 19 and on the sidebars.

Concerning the Embodiment of the Suspension in Particular According to FIGS. 3 and 4

The representations in the two figures are obtained with a section along a corresponding section line indicated in the respective figure. The representations are not true to scale.

The tensile retention holding device 6 comprises a base plate 24 which extends parallel to the respective plane of the associated flattened part, and onto which radial and tangential forces are forwarded from the winding 5 located in the support rails 21 of the winding chambers 19 via tensile elements 22 and 23. This base plate generally forms the cryostat inner wall 10b. This wall is either formed by the actual rotor body in the region of the associated flattened part or, as in the case of the embodiment shown in the figures, is connected integrally to the body on the respective flattened part. FIG. 3 shows the winding 5 in the cryostat 10, including the force absorption, in a cross section.

The tensile elements of the holding device 6 are preferably straps 22 or rods 23. They are advantageously made of a material with a low thermal conductivity, such as glass- or carbon-fiber reinforced plastic, which has a sufficient mechanical strength with a view to the forces occurring. These elements furthermore preferably allow tilting in the direction of the rotor axis, so as to absorb thermal shrinkage of the winding relative to the rotor body. FIG. 4 shows an embodiment with straps 22 as tensile elements, which are hung in suspension elements 20a (cold) and 20b (warm), in a longitudinal section.

The base plate 24 preferably has axially spaced parallel trapezoidal ribs 24a extending perpendicularly to the rotor axis, which are of a dovetailed design and engage in correspondingly shaped recesses 25 in the rotor body 4 so as to transmit thereto the forces acting on the winding 5.

An embodiment of the way in which the winding is held on the base plate for force transmission other than that represented may of course be provided. What is essential is only that the suspension also allows thermally induced shrinkages.

Further Embodiments of the Cryostat or Holding Device

According to FIG. 3, the ring cryostat 10 has a segmented cross section. It preferably is formed of a metal with high conductivity and thus acts simultaneously as a magnetic damper shield.

The outer contour of the rotor body 4 and the corresponding contour of the cryostat preferably form a cylinder, so as to minimize the air friction.

According to FIG. 5, the holding device 6 or its tensile elements may also be anchored directly on the rotor body 4. The winding region is then covered by bent wall segments 26 which can be welded vacuum-tightly at the edges to the iron of the rotor body. In this way, it is possible to form and maintain an insulating vacuum around the winding. The cryostat wall may be nonmagnetic or, in order to improve its weldability, it may be formed of a similar or identical magnetic material to the rotor body.

Concerning the Embodiment of the Winding Cooling in Particular According to FIGS. 1 and 2

Cooling tubes in which a cryogenic coolant K circulates with the use of free convection, and which preferably form one or more thermosiphons, extend along axially parallel branches on the superconducting rotor winding 5 or through it. When HTS material is used for the conductors of the winding, for example, it is feasible to use liquid neon (LNe) or liquid hydrogen ($LH_2$) or a mixture of these liquids with helium (He). The feed in the coolant input line 7a may be designed as axially parallel channels inside or as cooling tubes in thermal contact with the support rails 21 (cf. FIG. 3). The warmer return of the coolant in the coolant return line 7b advantageously extends close to the rotation axis, so as to generate a self-pumping effect during rotation. It is above all in thermal contact with the tensile elements 22, in order to capture heat flowing in via these elements before the winding 5. The radial coil parts located at the winding ends may, for example, be cooled only via thermal conduction along the superconductor.

At the excitation end, all the thermosiphon loops lead into a rotating storage container in the coolant space 8 (cf. FIG. 1), which is fitted around the rotor axis A in the vacuum of the cryostat housing 10. The liquid and the gas of the coolant K, which is in communication with an external cryocooler via a cryocoupling known per se with the vacuum-insulated coolant feed channel 9, are separated in this coolant space.

Other types of cooling which are known per se, for example forced cooling, may of course also be used for the machine discussed above. It is also conceivable to use a monophase gas such as helium, hydrogen or neon as the coolant. The gas may be at a pressure so high that it is in the supercritical state.

Concerning Embodiments of the Rotor Body 4 in Particular According to FIGS. 2, 5 and 6

As can be seen from FIG. 6, when configuring a rotor body 27 it is not absolutely necessary to start with an exactly circular shape of its cross section as in the case of the embodiments according to FIGS. 2 and 5. Instead, it may advantageously have a predetermined profile, for example in the form of further flattened parts 28, so as to obtain a better approximation to the desired field characteristic "B ∝ cos φ". The specific shape is to be found from field calculations. Here again, there are outer regions somewhat similar to circle segments in which the cryostat or cryostats 10 is/are arranged. As can be seen, in the proposed machine, the term configuration at least approximately similar to a circle segment for the outer regions also covers a shape in which the outer contour of these outer regions or of the cryostats need not exactly be in the shape of a circle arc.

Pole numbers p>2 may of course be employed. Here, p flat coils in particular of the racetrack type are fitted in their own cryostat housing in the manner represented in flattened regions on a p-sided rotor (base) body, in which case it may in particular have a core of ferromagnetic material to strengthen the field or be formed of this material at least in the region of the winding.

Concerning the Embodiment of the Winding Heads of the Winding 5

In the case of a two-pole rotor, such as one equipped with one of the flat windings described above, the winding ends must pass through the massive rotor body 4. According to the embodiment represented in FIG. 7, the rotor body 4 is assemble-able. For example, it is in three parts and comprises two disk-shaped end pieces 30a and 30b on the end sides, as well as a middle part 31 which receives the winding 5 and has two radially opposite flattened parts. The shaft ends 32a and 32b with the end pieces 30a and 30b are then not fastened with their e.g. grooved flanges on the middle part 31, for example screwed to it, until after assembly of the coil cryostat housing 10. FIG. 7 furthermore shows co-cooled parts 21a to 21d of support rails, on which the rotor winding 5 designed as a flat winding is held and integrally connected to the middle part 31. The support rail parts 21c and 21d are assigned axial coil parts 5c and 5d, while the support rail parts 21a and 21b hold radial coil parts 5a and 5b in the winding head regions of the winding 5.

The centrifugal force generates essentially tensile forces on the winding ends or heads in the radial winding parts 5a and 5b. In order to absorb the axial magnetic forces between the winding and the rotor body 4 or core, end-side support rails and tensile elements are likewise provided here. The tensile forces are absorbed either by optionally mechanically reinforced conductors of the winding or partially by the support rail parts 21a, 21b, if the coil parts 5a and 5b of the winding are adhesively bonded in the chambers with a suitable resin.

Figure 8:
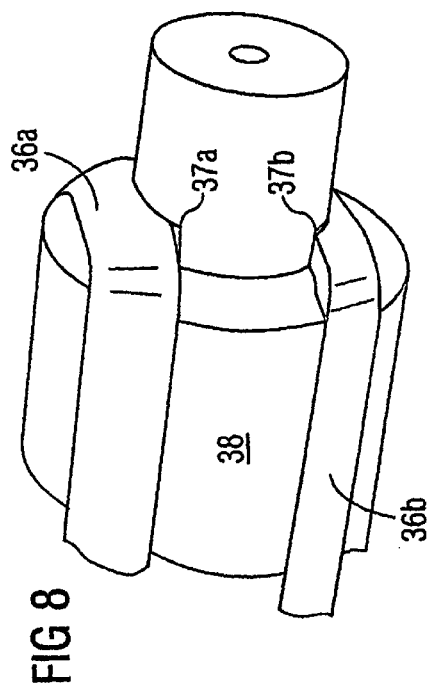

FIGS. 8 and 9 show an alternative design option of a two-pole rotor. Here, the rotor winding is subdivided into two separate sub-windings 35a and 35b, which are respectively located in their own ring cryostats 36a and 36b. These ring cryostats engage in end-side indentations 37a and 37b in the shaft ends 32a and 32b of a rotor body 38, which in this case is continuous. In this embodiment, compared to that according to FIG. 7, subdivision of the rotor body may be obviated.

Figure 10:
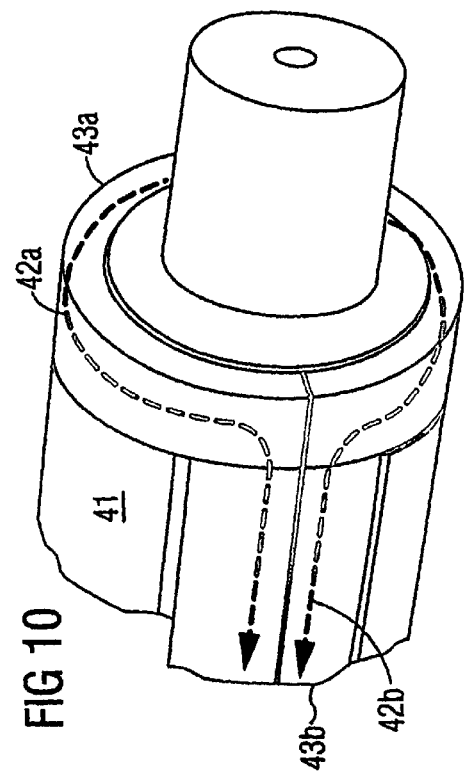
FIG. 10 shows another embodiment of a rotor body with two specially shaped cryostats or coils.

FIG. 10 shows a further embodiment with two cryostats on a continuous rotor body 41. In this embodiment, the rotor winding is subdivided into two superconducting saddle coils 42a and 42b (not shown in detail in the figure) which are located in correspondingly shaped cryostats 43a and 43b. Here again, the force absorption of the winding takes place with support rails and tensile elements. In this embodiment, when strip-shaped HTS conductors are used, it is necessary to comply with bending radii over the high edge which are often limited to at most one meter.

Specific Exemplary Embodiment

The following data relate to a two-pole rotor according to FIG. 1 for an 830 MVA turbo generator with an HTS winding:

| | |
|---|---|
| rotational speed | 50/s |
| rated torque | 2.4 MNm |
| rotor dimensions (Ø × axial length) | 1.16 m × 6.3 m |
| number of turns | 4100 |
| radial acceleration on winding | 55000 m2/s |
| winding height × width × number of chambers | 15 mm × 75 mm × 4 |
| width × thickness of support rail | 350 mm × 15 mm |
| radial force of total winding | 50 MN |
| tangential force of total winding | 4.5 MN |
| max. radial pressure on HTS conductor | 6.5 MPa |
| tangential pressure on HTS conductor | 5.8 MPa |
| length of the glass fiber reinforced plastic tensile elements | 0.06 m |
| (× = multiplication sign) | |

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A machine comprising:
    a superconducting rotor winding having coils;
    an uncooled rotor body mounted to rotate about a rotation axis, the rotor winding being arranged on the rotor body, the rotor body having outer regions respectively with uncooled flattened parts, the outer regions having a cross section that occupies a portion of an imaginary circle surrounding the rotation axis, with the flattened parts extending along chords of the imaginary circle;
    a cryostat occupying a portion of each outer region; and
    a tensile retention holding device provided for each outer region to hold the coil in tension within the cryostat, the holding device absorbing tensile forces acting on the rotor winding during operation of the machine, the entire structure of the holding device extending from one of the flattened parts of the rotor body to the rotor winding and communicating tensile forces to the rotor body through the uncooled flattened parts, the holding device including flexible tensile elements allowing tilting in the direction of the rotor axis to absorb thermal shrinkage of the winding relative to the rotor body.

2. The machine as claimed in claim 1, wherein the rotor body has a rotor core formed of a ferromagnetic material.

3. The machine as claimed in claim 1, wherein the cryostat is at least partially prefabricated and fastened to the flattened parts.

4. The machine as claimed in claim 1, wherein
    the rotor body has a cylindrical shape, and
    the cryostat has an outer contour that partially defines the cylindrical shape of the rotor body.

5. The machine as claimed in claim 1, wherein the cryostat is at least partially formed of a metal with high electrical conductivity so that the cryostat acts as an electromagnetic damper shield.

6. The machine as claimed in claim 1, wherein the tensile elements are strap-shaped and/or rod-shaped.

7. The machine as claimed in claim 6, wherein the tensile elements are designed such that the tensile elements allow longitudinal contraction of the rotor winding when cooling relative to the cryostat.

8. The machine as claimed in claim 6, wherein the tensile elements are formed of a thermally insulating material with sufficient mechanical strength to withstand centrifugal focus exerted when the rotor body rotates.

9. The machine as claimed in claim 6, wherein the rotor winding is provided on electrically insulated support rails and the support rails are fastened to the rotor body tensile elements.

10. The machine as claimed in claim 1, wherein the coils of the rotor winding are formed of superconducting conductors, the coils having a winding height, as measured in a radial direction, which is limited by a maximum permissible cumulative compressive stress of the superconducting conductors due to centrifugal and/or torque forces.

11. The machine as claimed in claim 10, wherein the coils of the rotor winding are respectively arranged in a plurality of winding chambers, the minimum number of chambers and/or coils being dictated by a maximum permissible winding height of a coil in a respective winding chamber.

12. The machine as claimed in claim 1, wherein for each outer region, the coil is embodied as a rectangular coil or a racetrack coil or two saddle coils.

13. The machine as claimed in claim 1, wherein the rotor winding has a rectangular coil or a racetrack coil arranged on a middle part of the rotor body.

14. The machine as claimed in claim 1, wherein the rotor winding is at least partially prefabricated.

15. The machine as claimed in claim 1, wherein coolant lines for a coolant extend axially parallel to the rotor winding or through it.

16. The machine as claimed in claim 15, wherein the coolant is circulated through the coolant lines with the use of free convection.

17. The machine as claimed in claim 15, wherein coolant lines circulate coolant in thermosiphon loops.

18. The machine as claimed claim 15, wherein at least some of the coolant lines are in thermal communication with the holding device.

19. The machine as claimed in claim 1, wherein the rotor winding has conductors formed of a high temperature superconducting (HTS) material.

20. The machine as claimed in claim 19, wherein the conductors are HTS strip conductors or HTS stranded composite conductors.

21. The machine as claimed in claim 1, wherein the machine is embodied as a generator.

22. The machine as claimed in claim 1 wherein the rotor body has a substantially circular cross section, and the outer regions having a cross section that occupies a portion of the circular cross section of the rotor body.

* * * * *